Oct. 25, 1960

S. E. FARMER 2,957,712

PRESSURE ACTUATED SEALING MEANS FOR
HYDRAULIC ACTUATORS

Filed June 6, 1956

INVENTOR.
Stanley E. Farmer
BY
Ramsey and Kolisch
Atty.

United States Patent Office 2,957,712
Patented Oct. 25, 1960

2,957,712

PRESSURE ACTUATED SEALING MEANS FOR HYDRAULIC ACTUATORS

Stanley E. Farmer, Portland, Oreg., assignor to Cascade Manufacturing Company, Portland, Oreg., a corporation of Oregon Filed June 6, 1956, Ser. No. 589,682

5 Claims. (Cl. 286—12)

This invention relates generally to sealing means for hydraulic actuators and more specifically to pressure operated members for use in conjunction with actuators to produce a self-adjusting tight seal.

The present application is a continuation-in-part of my co-pending application U.S. Serial No. 472,992, filed December 3, 1954, now Patent No. 2,836,443.

In the construction of hydraulic cylinders the provision of means for preventing fluid under pressure from leaking from the cylinder has been a continuing problem. Many different general solutions to the problem have been proposed, and the present invention, like my co-pending application, relates to an improvement in one of these solutions, e.g. the use of a pressure actuated sliding member to compress packing material during operation of the cylinder.

According to the present invention, there is no metal to metal seal relied upon for preventing the fluid from leaking. Conventional O ring seals are employed at all points where they may be efficiently used; however, at those points which may be subjected to increased pressures or where O rings are unsuitable for some other reasons a stack of packing material and a plurality of pressure actuated bushings for compressing the material are provided.

Figure 1:
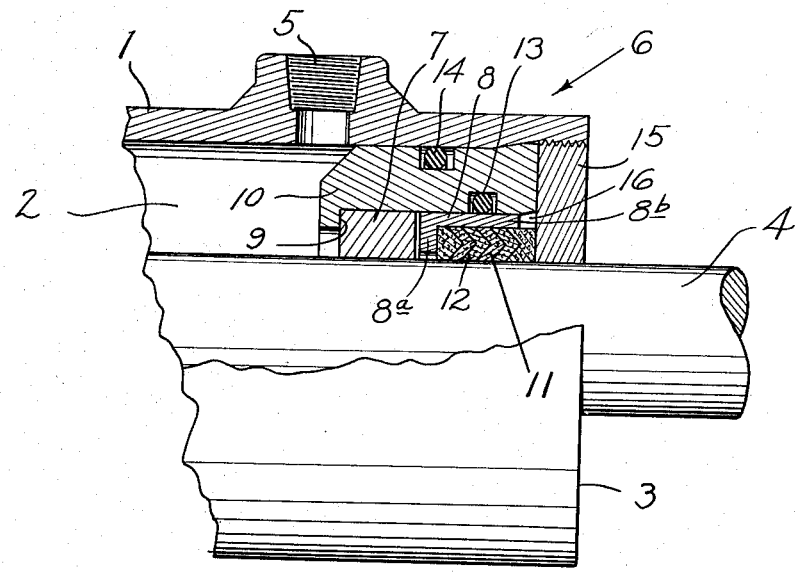
Figure 2:
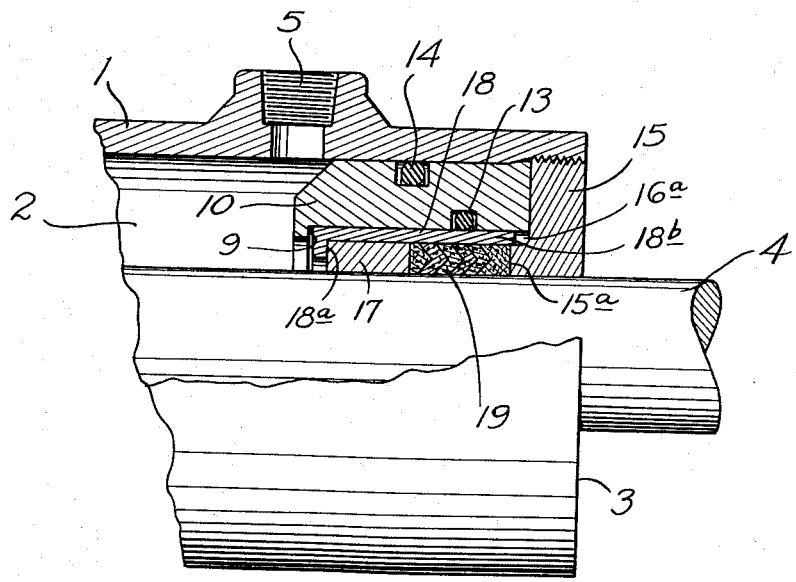

The invention resides in the combination and coaction of elements which will be better understood from the detailed description which follows when read in conjunction with the drawings in which:

Fig. 1 is a side elevation partly in section of an embodiment of the invention having a sealing structure as applied to a stuffing box; and Fig. 2 is a side elevation partly in section of another embodiment.

Broadly speaking, the present invention is concerned with a novel sealing means or fluid pressure seal for a pair of relatively movable, substantially concentric cylindrical surfaces. The novel sealing structure comprises using in combination a plurality of longitudinally slidable sleeve bushings, positioned one against the other and between said relatively movable cylindrical surfaces, each bushing contacting snugly at least one of said cylindrical surfaces, one of said sleeve bushings having at an end portion thereof a step which defines an annular shelf with the remaining portion of the bushing. Resilient packing material is carried in the shelf of this bushing and is pressed into sealing engagement with one of the cylindrical surfaces under the action of pressure, e.g., hydraulic pressure. The hydraulic pressure causes the bushing to move longitudinally and to compress the packing material against the surface to be sealed. Thus, during operation a positive seal is maintained at all times despite any wearing of the seal occurring during use.

Referring to the drawings, 1 is a tubular shell in partial section having a chamber 2. The shell has a closed forward end (not shown) which receives the piston head (also not shown), and a back end 3 having an opening through which piston rod 4, which is of smaller diameter than the bore, extends. The back end of the shell has port 5 connected to chamber 2 through which fluid under pressure may be admitted and exhausted under pressure in conjunction with another port (not shown) at the closed end of the shell. The piston head, which is fastened at the front end of piston rod 4, is in slidable engagement with the inside surface of the shell either in direct contact therewith or via bushings surrounding said piston head. The inside surface of the shell is preferably made from polished steel, and the outside surfaces of the piston head and rod 4 comprise chrome plated steel.

Near end 3 of the shell, a stuffing box assembly, generally indicated at 6, is provided for sealing the rod to the shell. Two longitudinally slidable bushings 7 and 8 are mounted around rod 4. Bushing 7 abuts shoulder 9 of a retainer 10 and also abuts step 8a of bushing 8. It will be noted that projection or skirt 8b and step 8a of bushing 8 define an annular shelf in which is stacked packing material 11 which is confined and held in place against the piston rod. The packing material is comprised preferably of a plurality of "Chevron" rings. Feather edges 12 of the "Chevron" rings engage the surface of projection 8b as well as the surface of the piston rod, the step 8a abutting against one end of stack 11.

Bushing 8 is sealed to the retainer member 10 via O ring 13, the retainer being likewise sealed to the interior of the shell by O ring 14.

A ring plug 15, threaded to the inside diameter of the shell, holds stack 11 in place. A small annular chamber 16 is provided between the end of projection 8b of bushing 8 and ring plug 15. This space permits longitudinal movement of bushing 8 to compress packing 11. The "Chevron" ring packing material is preferred where the surface with which it must maintain sealing engagement may become burred, nicked or otherwise irregular. This is particularly true for the portion of piston rods like 4 which in operation are exposed.

Ring plug 15 and retainer 10, which are secured to cylinder or shell portion 1, provide a confining means for bushings 7 and 8. Shoulder 9 of the retainer and the body of ring plug 15 function as longitudinally spaced, radially projecting stops limiting longitudinal sliding movement of the bushings. The cylindrical wall surface of retainer 10 which is located between shoulder 9 and ring plug 15, together with shoulder 9 and the body of ring plug 15, define, with the peripheral surface of rod 4, a stuffing chamber. This cylindrical wall surface of retainer 10 is indicated at 10a, and constitutes a stuffing chamber wall.

When fluid under pressure is introduced into the chamber through the port at the end of the shell and in the direction of the stuffing box, bushing 8 tends to move to the right. Bushing 7 acts as a support for rod 4 centering the rod concentrically within retainer 10, and has pressure applied to both sides and is in static balance. Therefore, it does not exert a force against bushing 8. The pressure reacts against bushing 8 between the inner diameter of O ring 13 and feather edge 12 of the packing, causing bushing 8 to compress packing 11 against rod 4. As "Chevron" rings become worn from continued use, there is a gradual diminution in the stack height of the pack. In order to compensate for this and to provide for a maximum sealing engagement throughout the useful life of the packing material, space 16 of suitable dimension is provided between the end of the sliding bushing 8 and ring plug 15 so that the bushing may move to the right and continue abutting the stack and apply pressure against the packed "Chevron" rings. Thus, when rod 4 becomes worn or damaged after continued use, the effectiveness of the stuffing box will not be impaired as the sliding bushing and seals cooperating therewith are not exposed to damage.

The use of bushing 7 in the structure presents certain advantages. For example, as bushing 7 is a part subjected to wear, which necessitates replacement, it should be made from bearing material. However, bushing 8 is not subject to wear and may be made of less expensive material. Bushing 7 is a standard bushing form and may be purchased as a commercially available item from bushing manufacturers.

Fig. 2 shows another embodiment of the invention in which one slidable bushing abuts and is contained within the other. Retainer member 10, which is sealed against the inner surface of the shell 1 by means of O ring 14, surrounds slidable bushing 18 in sealing contact therewith by means of O ring 13. Projection 9 of the retainer member abuts the end portion of bushing 18 adjacent step 18a which, together with projection 18b of the bushing, defines in cross-section an annular L-shaped shelf which has confined in it movable bushing 17 which abuts against step 18a at one end and at the other end "Chevron" rings 19, also confined substantially within the annular shelf. When fluid pressure is applied against the movable bushings, bushing 18 is caused to move towards the right, thus moving bushing 17 which in turn applies pressure to resilient packing 19 causing it to be sealingly compressed against the surface of rod 4. An annular space 16a is provided to allow longitudinal movement of bushing 18. The packing material is restrained from moving bodily to the right by means of plug 15 which has a projecting hub 15a which projects into the space defined by the annular shelf and abuts against one end of the packing.

When reference is made to relatively moving cylindrical surfaces it is meant that in the case of the piston head and the inner surface of the shell, it is the relative movement of one referred to the other. In the case of the stuffing box, such relative movement may be between the piston rod and the inner surface of an annular retainer member, as shown in Figs. 1 and 2. While the figures illustrate the inventive concept as applied to the stuffing box assembly, the same concept may be applied to relatively moving cylindrical surfaces involving the piston head and the shell of the type shown in my copending application, Serial No. 472,992, now Patent No. 2,836,443.

While the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. A fluid pressure seal construction for a piston rod and cylinder combination for sealing an end wall of the cylinder about the piston rod; said construction comprising a cylindrical stuffing chamber wall fixed relative to the cylinder, extending axially inwardly of the end wall thereof, and concentric with the surface of the piston rod; an annular shoulder projecting radially inwardly from said stuffing chamber wall, spaced axially from the end wall of the cylinder and defining with the end wall and stuffing chamber wall a stuffing chamber; at least a pair of sleeve bushings encircling the piston rod and mounted within said stuffing chamber; each of the sleeve bushings having substantially cylindrical inner surface portions directly encircling the piston rod but not sealed thereto, whereby fluid flow is accommodated past said surface portions; and resilient packing material encircling the piston rod and contacting the rod along an area located axially intermediate said inner cylindrical surface portions of said bushings and the end wall of the cylinder; one of said bushings having an annular skirt projecting axially toward the end wall of the cylinder from the outer perimeter of the bushing and bounded by a cylindrical outer surface snugly adjacent the stuffing chamber wall and a cylindrical inner surface spaced radially from the rod; means sealing the cylindrical outer surface of the skirt to the stuffing chamber wall; said inner surface of said skirt defining with the remainder of said one bushing an annular shelf; said packing material being carried in said shelf and pressed by said one bushing into sealing engagement with the piston rod; said other bushing centering said piston rod and cylinder in substantially concentric relationship.

2. A fluid pressure seal construction for a piston cylinder device having a piston rod portion and cylinder portion, for sealing an end wall of the cylinder portion about the rod portion; said seal construction comprising an annular shoulder within the interior of the device projecting radially from one of said portions toward the other of said portions; said shoulder being spaced axially from the end wall of the cylinder portion; a pair of concentric cylindrical surfaces presented by the cylinder portion and the rod portion extending between the end wall of the cylinder portion and said shoulder; said shoulder, end wall and cylindrical surfaces defining an annular stuffing chamber; at least a pair of sleeve bushings mounted within said stuffing chamber; each of said sleeve bushings having substantially cylindrical surface portions disposed directly adjacent the cylindrical surface of said other portion but not sealed thereto, whereby fluid flow is accommodated past said surface portions of said sleeve bushings; an annular ring of resilient packing material mounted within said stuffing chamber contacting the cylindrical surface of said other portion along an area located axially intermediate said cylindrical surface portions of said sleeve bushings and the end wall of the cylinder portion; one of said bushings having an annular skirt projecting axially toward the end wall of the cylinder portion with the skirt bounded by a first surface snugly adjacent the cylindrical surface of said one portion and a second surface radially spaced from the cylindrical surface of said other portion; and means sealing said first surface and the cylindrical surface of said one portion; said second surface of said skirt defining with the remainder of said one bushing an annular shelf; said packing material being carried in said shelf and pressed by said one bushing into sealing engagement with the cylindrical surface of said other portion; said other bushing centering said piston rod portion and cylinder portion in substantially concentric relationship.

3. The improved seal construction of claim 2 wherein the packing material comprises rings of V-shaped cross-sectional outline nested within each other.

4. The fluid pressure seal construction of claim 2 wherein the pair of sleeve bushings are arranged end to end, one in front of the other.

5. The fluid pressure seal construction of claim 2 wherein said other bushing is mounted in said shelf together with said annular ring of resilient packing material.

References Cited in the file of this patent

UNITED STATES PATENTS

| | | |
|---|---|---|
| 1,725,836 | Solberg | Aug. 27, 1929 |
| 2,281,933 | Gage | May 5, 1942 |
| 2,533,531 | Stephens | Dec. 12, 1950 |
| 2,667,348 | Frye et al. | Jan. 26, 1954 |
| 2,692,584 | Armington et al. | Oct. 26, 1954 |
| 2,874,983 | Densmore | Feb. 4, 1959 |

FOREIGN PATENTS

| | | |
|---|---|---|
| 896,468 | France | May 2, 1944 |
| 648,628 | Great Britain | Jan. 10, 1951 |